United States Patent
Wylie et al.

(10) Patent No.: US 7,203,560 B1
(45) Date of Patent: Apr. 10, 2007

(54) SYSTEM AND METHODOLOGY FACILITATING REMOTE AND AUTOMATED MAINTENANCE PROCEDURES IN AN INDUSTRIAL CONTROLLER ENVIRONMENT

(75) Inventors: Douglas R. Wylie, Eastlake, OH (US); John Joseph Baier, Mentor, OH (US); David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 877 days.

(21) Appl. No.: 10/162,342

(22) Filed: Jun. 4, 2002

(51) Int. Cl.
*G06F 19/00* (2006.01)

(52) U.S. Cl. .................................. 700/110

(58) Field of Classification Search ........ 700/108–111, 700/78–80, 67, 174; 709/223, 250, 224, 709/217
See application file for complete search history.

(56) References Cited

U.S. PATENT DOCUMENTS

| | | | |
|---|---|---|---|
| 5,710,723 A * | 1/1998 | Hoth et al. ................. 702/181 |
| 5,805,442 A * | 9/1998 | Crater et al. ................... 700/9 |
| 6,370,582 B1 * | 4/2002 | Lim et al. .................... 709/230 |
| 6,385,497 B1 * | 5/2002 | Ogushi et al. ............... 700/110 |
| 6,532,426 B1 * | 3/2003 | Hooks et al. .................. 702/81 |

* cited by examiner

Primary Examiner—Thomas K. Pham
(74) *Attorney, Agent, or Firm*—Amin Turocy & Calvin LLP; R. Scott Speroff (57) ABSTRACT

The present invention relates to a system and methodology facilitating remote maintenance in an industrial control environment. An industrial control system is provided that includes an industrial controller to communicate with a network. Explicit and/or implied maintenance events are determined, wherein one or more automated actions are configured or adapted to interact with remote users over the network in response to the events. This can include configuring and communicating human-readable schemas describing the events in support of remote maintenance procedures. The schemas can include embedded documentation to further aid diagnosis and correction of potential problems. Other aspects can include automated actions such as automatically generating component orders and providing remote firmware and/or documentation upgrades.

40 Claims, 11 Drawing Sheets

SYSTEM AND METHODOLOGY FACILITATING REMOTE AND AUTOMATED MAINTENANCE PROCEDURES IN AN INDUSTRIAL CONTROLLER ENVIRONMENT

TECHNICAL FIELD

The present invention relates generally to industrial control systems, and more particularly to a system and methodology to facilitate proactive and diagnostic failure detection of events in support of automated maintenance processes in a networked industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet®, DeviceNet® or other network protocols (Foundation Fieldbus (H1 and Fast Ethernet) Modbus TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Modern control systems generally provide elementary status relating to diagnostic aspects of the system. This can include fault bits reflecting hardware detected failures such as watchdog timer values and can include software recorded information such as communications retry counters. Often times, PLC programmers write custom PLC code to monitor diagnostic bits or data and then write specialized control programs to respond to such data. This type activity can be very time consuming to develop and test an effective control solution that responds in accordance with detected diagnostic behavior. In addition, obtaining timely, useful and human-readable diagnostic data from the PLC or associated system can also be problematic. Moreover, most diagnostic bits or status elements that are provided by PLC's are relatively static in nature. Thus, controller programs that respond to such information generally are written in a reactive mode, whereby a potentially disruptive situation (e.g., PLC shut down) has already occurred before any type of corrective actions are performed.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide a well-defined, event-driven framework to facilitate remote maintenance within an industrial controller environment. One or more external and/or internal events are monitored or detected by an event processor, wherein an action component can drive an associated maintenance action configured or adapted for the detected event. Events can include explicit items such as routine maintenance conditions, external data or command events from remote networks or modules communicating with a controller, data range checking, and detection of error or fault conditions, for example. Events can also include implied or inferred conditions that can be determined by the event processor. These type events include applying inference analysis, probabilistic analysis, and/or statistical analysis to determine more subtle conditions such as analyzing data for trends that may not produce a hard-failure, yet, indicate a deterioration or degradation in system performance over time. In this manner, potential problems can potentially be proactively corrected in accordance with automated and prognostic procedures or models.

In response to the detected events, actions can include transmitting human-readable schemas to selected users at remote locations, wherein the schemas describe the detected event or events and associated event data. This can include providing visual or temporal data (e.g., MPEG, JPEG) that define a sequence leading up to the event and/or provide remote operator displays for interacting with the controller. Other actions can include serving embedded documents or help files, or hypertext links or references, relating to the detected event to facilitate remote diagnosis and troubleshooting. As time passes, and controller firmware and/or the embedded documentation becomes dated, remote data transfers can occur to update the firmware and/or documentation. In addition, automated actions can occur such as automatically generating and creating an order to replace a detected device failure.

In accordance with one aspect of the present invention, a communications component is provided to facilitate remote access to the controller. The communications component can include several modes for sending/receiving remote data such as polling modes, broadcast modes—including one-shot and continuous data broadcasts from the controller, and request/reply modes whereby data is transmitted in response to a remote request. Communications modalities can include web server functionality for Internet communications, e-mail functionality for intermittent or one-time broadcasts, and/or other types of communications such as dial-in services for receiving maintenance data from the controller.

One or more XML schemas can be transmitted and received by the communications component to provide data that facilitates remote diagnosis and maintenance of the controller and associated system. The schemas can be defined as an event schema, a status schema, and an update schema, for example. The event schema includes elements that define event types, action(s) selected, event data, diagnostic data, machine addresses and names, parties contacted, parties responding, actions required, and/or optional actions. The status schema can be retrieved from the controller via a remote request. This type schema can include firmware revision information, documentation revision information, program revision information, processor status information, and/or other information. If it is determined from the status schema that one or more elements require newer revisions, the update schema can be employed to include and/or specify updated information for the controller. For example, if a firmware upgrade is determined, an element in the update schema can specify that a binary file will follow the schema, and is to be employed in updating the controller's firmware. If a documentation or other type revision is determined, data can be included within the update schema to perform the revision. The schemas can interact with a generic, hardware-neutral software architecture, to support third-party installation of remote maintenance components within various controller platforms.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating remote maintenance in an industrial control environment. An industrial control system is provided that includes an industrial controller (e.g., PLC, PC-based controller or equivalent) to communicate with a network such as the Internet. Explicit and/or implied maintenance events are determined, wherein one or more automated actions are configured or adapted to interact with remote users across the network in response to the events. This can include configuring and communicating human-readable schemas describing the events in support of remote maintenance procedures. The schemas can include embedded documentation such as help files to further aid diagnosis and correction of potential problems. Other aspects can include automated actions such as automatically generating component orders and providing remote firmware and/or documentation upgrades.

Figure 1:
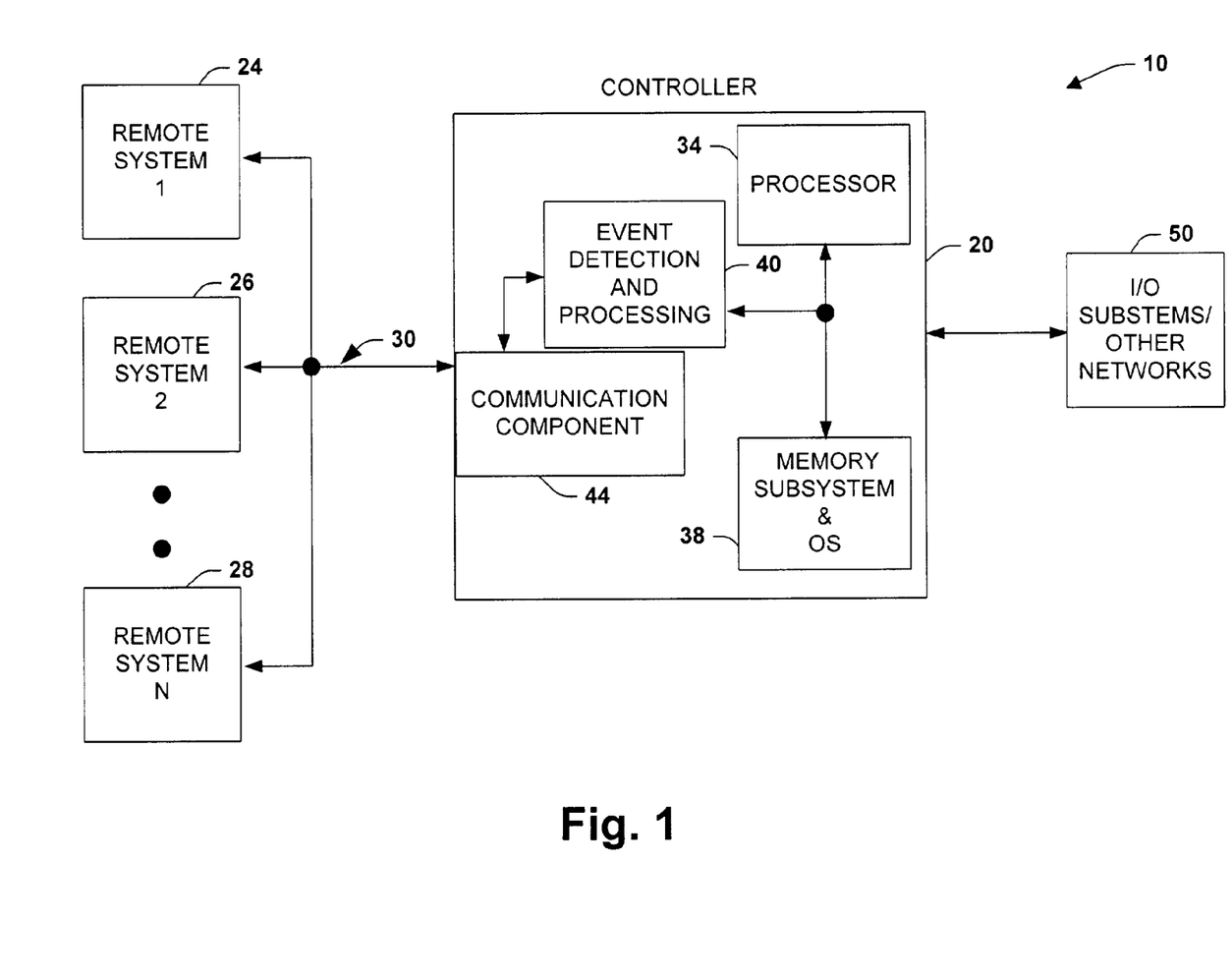
FIG. 1 is a schematic block diagram illustrating an industrial controller and event architecture in accordance with an aspect of the present invention.

Referring initially to FIG. 1, an industrial control and event processing system 10 is illustrated in accordance with an aspect of the present invention. The system 10 includes an industrial controller 20 communicating to one or more remote systems 24–28 across a local factory and/or a public network 30 such as the Internet. This can also include other communications options such as phone connections and/or wireless connections. A processor 34 (or processors) in the controller 20 executes from an associated memory subsystem 38 that can include an operating system (e.g., Microsoft® Windows® NT/2000/XP, Windows CE, Linux, .NET, OS-9, UNIX, VRTX, QNX, VxWorks, CE.NET, custom-designed).

An event detection and processing component 40 interacts with a communications component 44 and the processor 34 to facilitate remote maintenance of the controller 20. As an example, remote system at 24 can reside as an Internet location for a user having responsibilities for maintaining the controller 20. If an event is detected by the event component 40, an action such as configuring and transmitting a schema (described below) to the user can occur via the communications component 44, wherein the schema describes details relating to the event. The communications component 44 can be configured in one or more possible communications modalities such as a web server, e-mail server, voice mail server, pager, and dial-in server, for example, wherein the modalities can be adapted in one or more possible modes such as polling modes, broadcasting modes, and/or request/reply modes to deliver maintenance information to the remote user.

The event detection and processing component 40 monitors a plurality of events such as inputs or data within the controller 20, the network 30 and/or associated I/O subsystem 50 to determine a possible maintenance action or actions in accordance with the present invention. Events can include predetermined events that are calendared to occur according to routine maintenance conditions such as replacing a battery, memory cell, or filter, for example. Other events can include monitoring fault bits or fault inputs and performing diagnostics such as a memory checks to determine the event. This can include performing range checks within a predetermined threshold (e.g., diagnostic data within prescribed low and high operating data thresholds) and receiving explicit events such as an interrupt or fault signal indicating a maintenance condition or problem.

In accordance with one aspect of the present invention, events can be determined in a proactive manner according to a prognostic determination of potentially problematic conditions. For example, inputs, data, a sequence of data, a variance of data and/or patterns of data or inputs can be monitored for possible trends in the data (e.g., com bit error from an I/O module has occurred twice as many times as a previous period). This can include statistical or probability analysis to determine if a possible maintenance condition has occurred. As one particular example, analog or other type data can be monitored over time, whereby if the data falls outside of a predetermined range, an outside range event is generated and subsequently processed. However, this data may generally subscribe to a detectable, modeled, and/or predicable pattern during normal operations within the range. Thus, if the pattern changes—even though the data is still within the predetermined range, a different type event can be generated alerting users of a potential problem or problems.

For example, analog data may be monitored for a high threshold of 0FFF hex and a low threshold of 0200 hex, wherein the data is generally about 0800 hex. If this data were also being monitored for possible trend analysis, consistent readings near the thresholds or a detected increase in data variation may signal a problem with the respective analog module or transducer interfacing to the module. As will be described in more detail below, a plurality of actions can be mapped to the events in order to facilitate remote maintenance of the system 10. It is noted that the event detection and processing component 40 and/or communications component 44 can reside in the controller 20 and/or reside outside of the controller such as in an associated communications module or server (not shown) in order to provide maintenance access to the controller. The controller 20 can also communicate to various Input/Output subsystems 50 and/or other networks (e.g., Analog, Digital, Programmed/Intelligent I/O modules, other programmable controllers, communications modules, networks).

Figure 2:
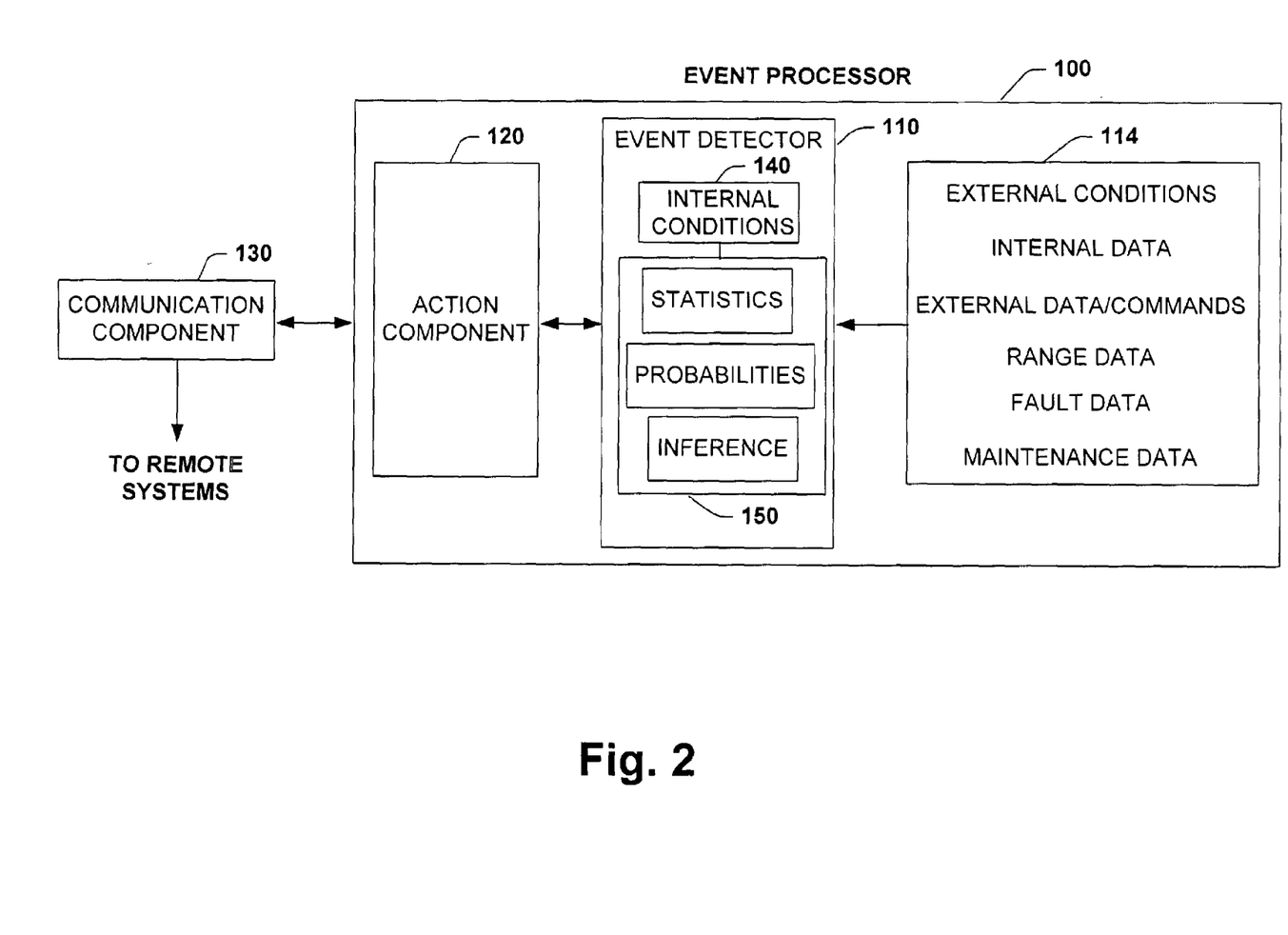
FIG. 2 is a schematic block diagram illustrating an event processor in accordance with an aspect of the present invention.

Referring now to FIG. 2, an event processor 100 is illustrated in accordance with an aspect of the present invention. An event detector 110 monitors or receives a plurality of event inputs at 114 to generate an event that drives an action component 120. The action component 120 maps one or more maintenance actions to one or more of the event inputs 114 and/or internally detected events that are described below. Actions can include configuring a schema and notifying a remote user of the detected events 114 via a communications component 130 providing web or other type data access, for example. As will be described in more detail below, other type actions can include pushing data files such as an MPEG or JPEG file relating to the associated event. Actions can also include automated actions such as ordering a device or component based on a detected event. Additionally, maintenance documentation or data can be provided to facilitate troubleshooting of a control system.

At 114, event inputs can include various types. External conditions can be monitored such as monitoring status or data from a remote network or back plane. Internal conditions such as from components interfacing to a processor (e.g., memories, interrupts, busses, peripherals, latches, clocks and so forth) and associated data can be monitored for potential failures or irregularities. External data events or commands can be monitored and detected at 114. This can include remote network commands to request status and/or to initiate data upgrades such as documentation or firmware. As noted above, range data (external or internal) can be monitored for values that fall outside of a predetermined range. Other type data that can be monitored include fault data or bits from diagnostic routines that may be running as part of background operations. In addition, maintenance data can be detected such that at predetermined time or date intervals, maintenance events can be triggered such as ordering and/or replacing system components on a routine basis or schedule.

In addition to the event inputs 114, the event detector 110 can determine internally generated events at 140 based upon implied or inferred conditions of system health. This can include inference, statistical, and/or probability analysis at 150 for a subset of data or inputs that is monitored for routine or modeled patterns over time. If the data subset deviates from the determined pattern, internal events can be fired that invoke one or more actions in the action component 120 such as a notification to a remote user. Data patterns can be determined in accordance with a plurality of techniques. A statistical analysis of data or inputs can include substantially any technique such as averaging, standard deviations, comparisons, sampling, frequency, periodicity and so forth.

In another aspect of the present invention, data patterns or processor operations can be stated as a general probabilistic estimate to determine a maintenance condition given monitored evidence of an input pattern or occurrence. The estimate can be stated as:

EXAMPLE 1

$Pr(Cm|E_1, E_2, \ldots E_J)$;

wherein Pr is a probability, Cm relates to a maintenance condition given evidence E relating to deviations or differences from monitored patterns or models, and J being an integer. Thus, probability thresholds can be configured that fire an event (leading to action) based upon the probability estimate being above a predetermined probability threshold (e.g., 85% determination system condition or data pattern is inconsistent with previous pattern or patterns fires an event causing remote user to be notified).

It is noted that probability models can be constructed from typical controller operations. This can include monitoring data for typical variances and monitoring such aspects as how often particular events occur. In addition, inference models can be constructed such that multiple and/or unrelated events can possibly indicate that a problem may occur. For example, if a large increase in network communications is detected, and an associated decrease is detected with the number or type of I/O samples received over time, then a possible inference is that system processing capabilities have become overloaded or network activities have induced noise problems in the I/O subsystem. It is to be appreciated other inferences can occur and that more or less general inferences can also be determined.

Classification models can be constructed that learn routine behaviors or patterns in order to generate probabilities that predict potential system problems. For example, such techniques can include Support Vector Machines (SVM), Naive Bayes, Bayes Net, decision tree, similarity-based, vector-based, and/or other learning models or combinations thereof. Classifiers can be stated as a function that maps an input attribute to the confidence that the input belongs to a class. In the case of pattern recognition, attributes can be typical data subsets or values sampled over the course of time and/or include other pattern-specific attributes derived from the data subsets.

Figure 3:
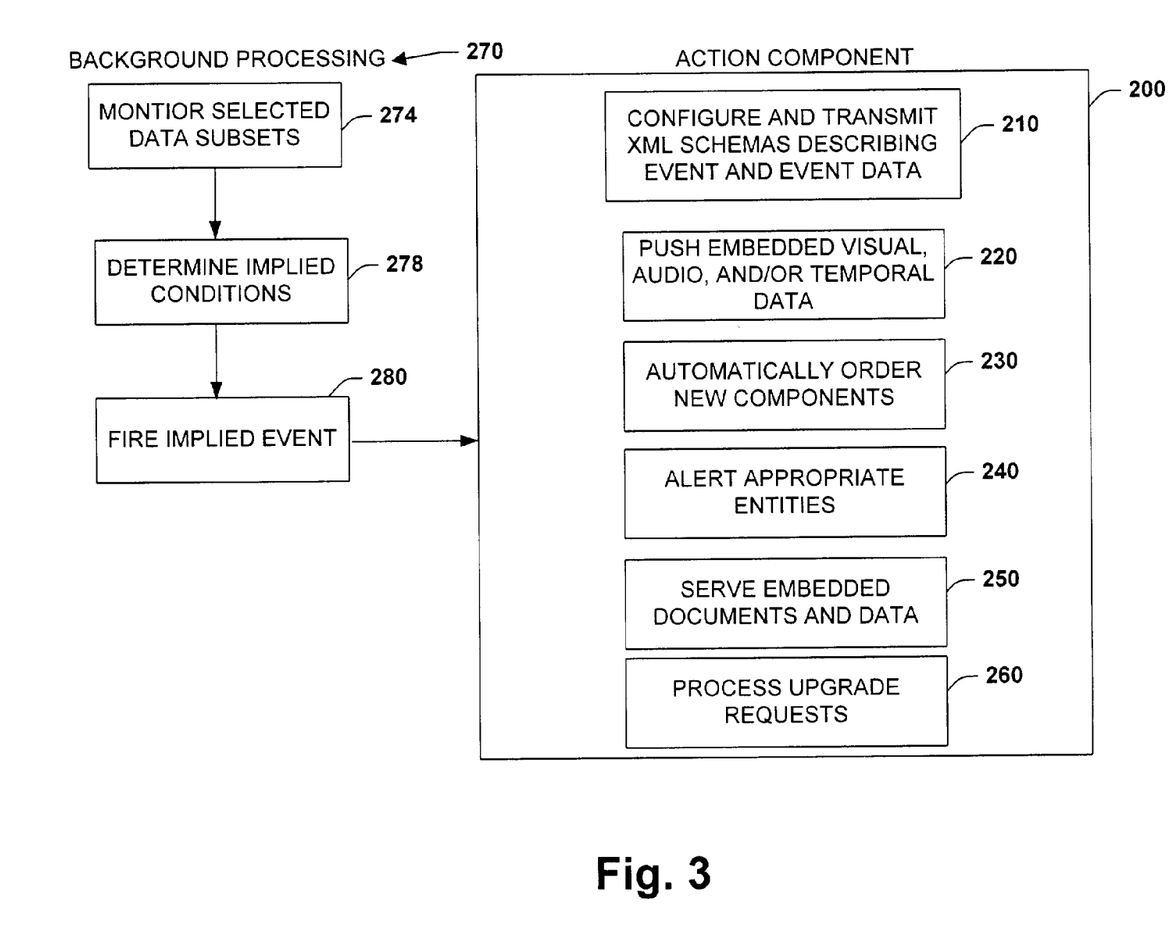
FIG. 3 is a schematic block diagram illustrating an action component in accordance with an aspect of the present invention.

Turning now to FIG. 3, an action component 200 is illustrated in accordance with an aspect of the present invention. It is to be appreciated that the action component 200 can include one or more software elements or functional blocks that direct processing execution or operations to perform the associated action. A first action at 210 can be to configure and transmit an XML schema describing an associated event or events and data relating thereto to a remote system or user, and is described in more detail below. A second action at 220 relates to pushing or transmitting a data file such as an MPEG sequence, JPEG, GIF or other type image, HTML page, XML data and/or other data relating to the event. For example, predetermined and embedded data files can be stored for an associated event. Other data such as video/audio data can be captured before, during, and/or after an event (e.g., camera/microphone situated in a factory) to help determine from a remote location what has previously occurred. This can also include transmission of data patterns or sequences, program logic, and/or display screen snapshots to further aid troubleshooting of the event.

At 230, component orders can automatically be generated and sent to a respective vendor to fulfill the order. This can include associating a number of different forms that are related with a site or data location (e.g., web site address) of a component or device vendor. If a problem related to an event is detected, an electronic form indicating the quantity and type of component can be generated and sent to the respective vendor. In another aspect, a generic electronic form (e.g., spread sheet, word document) can be generated including a description and quantity of the faulty component, wherein addresses (e.g., stored, predetermined list of vendor e-mail addresses selling specified components) for order fulfillment can be searched by component type and subsequently employed to send the generic form. In this manner, automated, proactive actions can occur to facilitate rapid replacement of defective components and/or acquire components that need replaced during the routine course of maintenance.

At 240, appropriate entities for receiving maintenance information such as machines or users are notified of a detected event. This can include the schemas configured at 210 and include other actions such as generating e-mail messages, pages, and voice mail messages to alert users or systems of an event. At 250, embedded documents such as machine manuals or help files can be served to remote systems. This can include associating documents or respective portions of files or documents to the detected event before serving the information to a remote system. For example, if a problem is detected with a remote network operating with the controller, schematics detailing the network can be transmitted. This can include troubleshooting information relating to the network such as communications error code definitions and/or include information relating to network protocols. In addition, help menus can be served (e.g., drill-down web page or hypertext link or reference detailing available information), wherein remote users can request further information if desired. In addition, programming or control screens can be generated to enable a remote user to gain access to the controller.

At 260, events can be generated from the users operating remote systems to cause upgrade actions. Such actions can include processing remote requests to upgrade one or more software, firmware, and/or data portions of the controller and/or associated system. This can include acting upon requests to upgrade firmware, upgrade embedded documentation, and/or upgrade stored data such as a processor program or related system variables. It is to be appreciated that a portion of a controller's memory can be reserved to temporarily process and store upgrade data (or portions thereof) before committing changes to controller memory. This can also include reserving small, boot-code sections in firmware or other memory that execute the upgrade process. At 270, background processing is illustrated for implied or inferred events described above. This can include monitoring one or more data or input subsets at 274, determining an implied maintenance condition at 278 (e.g., via statistical or probabilistic analysis), and firing an implied event at 280 based upon an analysis of the data subset at 278. The implied event at 280 can then be processed by the action component 200, wherein one or more of the actions 210 through 260 can be can be configured and invoked.

Figure 4:
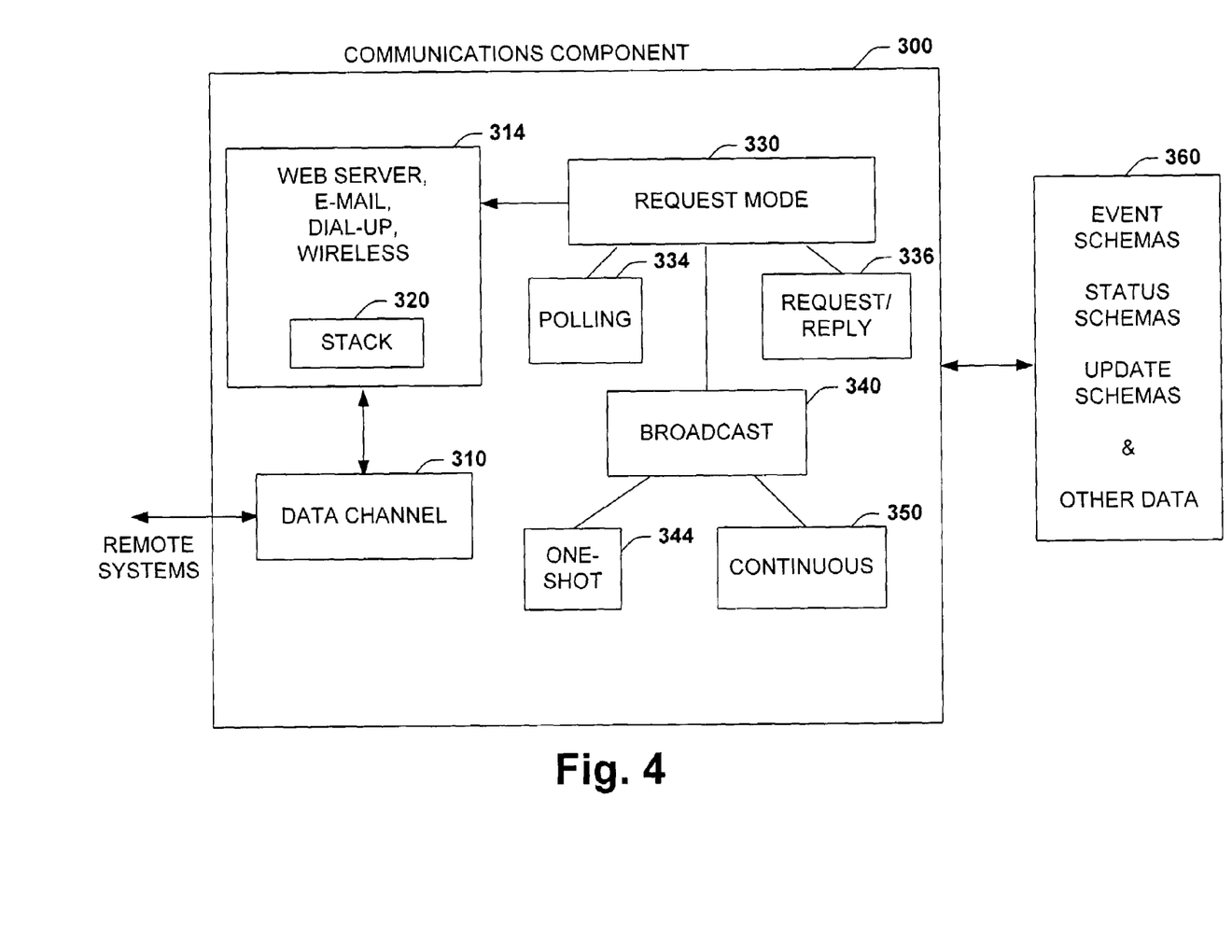
FIG. 4 is a schematic block diagram illustrating a communications component in accordance with an aspect of the present invention.

Referring to FIG. 4, a communications component 300 is illustrated in accordance with an aspect of the present invention. A data channel 310 (or data channels) can be configured to communicate with remote systems via a communications processor 314. As illustrated, the communications processor 314 can be configured or adapted for a plurality of various communications options or combinations thereof such as a web server, web service (e.g., Web Service Description Language) provider, e-mail server, dial-up server, wireless access server, pager, and so forth, wherein respective server components can send information to and receive information from multiple remote systems. The data channel 310 can include at least one standard socket (e.g., HTTP) for web communications and/or other type sockets (e.g., Secure Socket Layer SSL Socket) to exchange information with remote systems. For example, the standard socket can be an HTTP socket, an FTP socket, a TELNET socket, and/or other network socket.

The communications processor 314 includes a socket interface (not shown) that directs/translates industrial controller communication protocols to/from TCP/IP (or other protocol) and is instantiated by a stack 320. For example, a socket instance, which may be invoked from a remote browser and/or other application, includes information about a controller such as an IP address and port address. The stack 320 presents a layered communications interface to networks such as the Internet and may interface to one or more drivers to communicate with remote systems. One possible driver is a point-to-point (PPP) driver (not shown) for communicating over a phone line. Another possible driver is an Ethernet driver (not shown) that communicates through a Local Area Network (LAN) to remote systems. It is to be appreciated that a plurality of other drivers and network interfaces are possible.

The stack 320 (e.g., TCP/IP stack) may be associated with one or more other network layers. A physical layer may be provided that defines the physical characteristics such as electrical properties of a network interface. A data-link layer defines rules for sending information across a physical connection between systems. The stack 320 may include a network layer, which may include Internet protocol (IP) that defines a protocol for opening and maintaining a path on the network. A transport layer associated with the stack 320 may include Transmission Control Protocol (TCP) that provides a higher level of control for moving information between systems. This may include more sophisticated error handling, prioritization, and security features. A session layer, presentation layer, and application layer may also be optionally included that sit above the stack 320.

A request mode component 330 can be employed to direct one or more communications aspects in the communications processor 314. This can include providing configuration information (e.g., flags, parameters) that determine how the communications processor 314 notifies and/or responds to remote systems. The configuration information can include mode settings such as a polling mode 334, a request/reply mode 336, and/or a broadcast mode 340 which are selected based upon user configurations and/or based upon an associated event. The polling mode 334 is generally provided as a one-time response to a request for a block or a contiguous block of data. In other words, a remote request is received by the communications processor 314, wherein status data is read from various aspects of a controller system, bundled in a data block or schema and sent as a package of data to the remote system to facilitate a general status determination of a controller system. After the data block request, no further communications are attempted unless a subsequent remote polling request is received.

The request/reply mode 336 relates to more immediate interactions with a controller system. This can include going online with a controller or communications module and serving various web or interface pages in response to remote requests. As an example, remote systems may dial-in to a home page which serves as an initial request for home page data, wherein the reply to the remote request is to transmit data relating to the home page. As further items are selected from the home page or other areas, data can be served in response to the selected items (e.g., drilling down to other pages and serving maintenance data in response to the selected page).

The broadcast mode 340 is generally provided as an immediate, out-going transmission to a detected maintenance event in the control system. As an example, if a fault condition is detected, a data transmission can be initiated with a remote system that includes associated data relating to the detected event. The data can be transmitted in a one-shot mode 344 such as an e-mail transmission, voice-mail transmission (e.g., predetermined stored message or automatically generated audio message relating to event), and/or a page to a maintenance location or person responsible for attending to the event. In another aspect, a continuous mode broadcast 350 can be initiated, wherein a remote interface page or data is transmitted in response to an event and subsequent status updates are transmitted in accordance with a regular time interval (e.g., broadcast refresh data to a web page or Internet address every two seconds). As will be described in more detail below in relation to FIGS. 5–7, one or more schemas 360 can be employed to interface and exchange data with the communications component 300 in accordance with the detected event and/or request mode 330.

Figure 5:
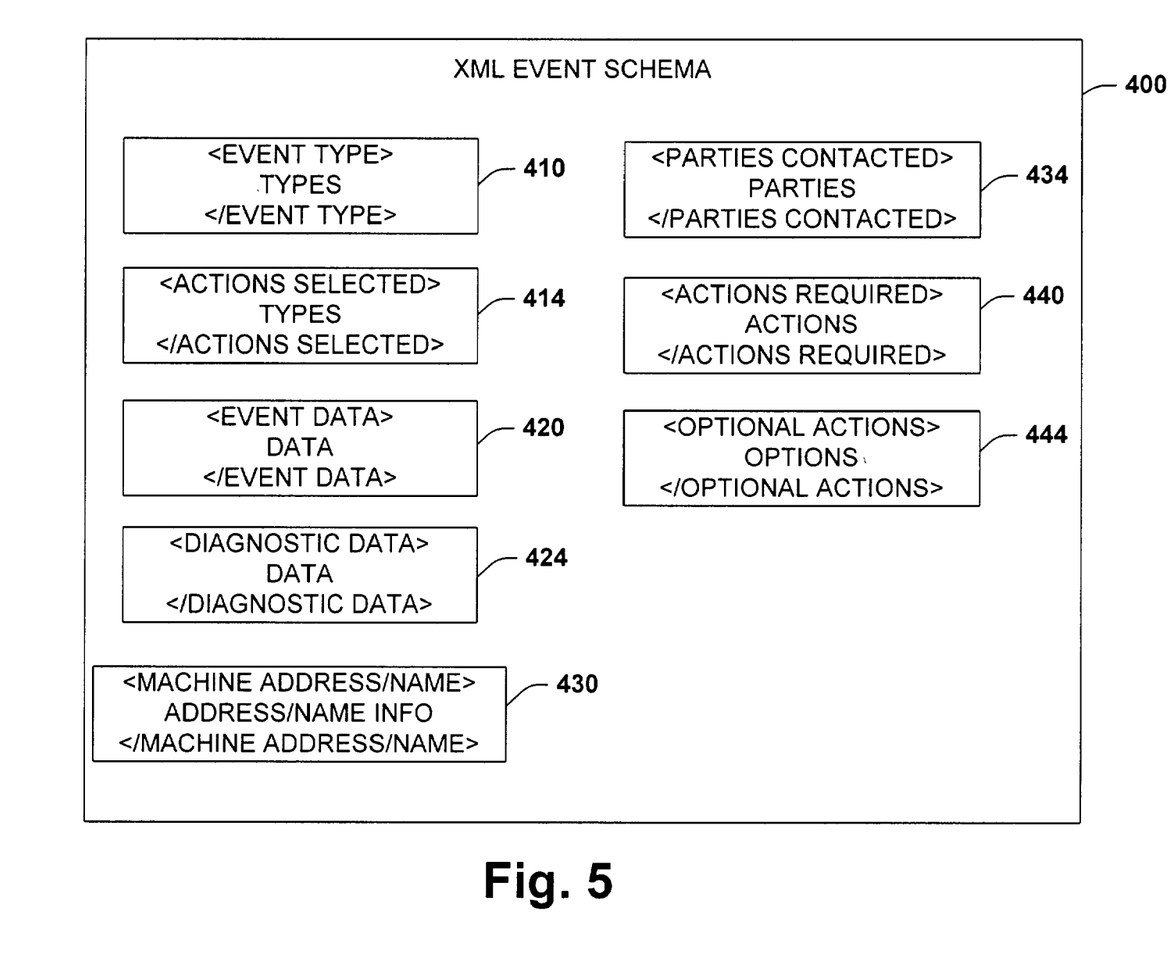
FIG. 5 is a diagram illustrating an event schema in accordance with an aspect of the present invention.

Referring now to FIG. 5, a diagram 400 illustrates an event schema in accordance with an aspect of the present invention. The event schema 400 includes one or more XML elements 410 through 444 (defined by starting and ending tags with (</> symbols), arranged in substantially any order) that relate to one or more events and provide information to facilitate remote maintenance of a controller system. Although not shown, the XML elements and associated tags can also include attribute information if desired, wherein an attribute is a name-value pair associated with an element start tag (e.g., <event type="non-critical event">).

At 410, an event type element is provided. This can include a plurality of types such as hardware failure, diagnostic failure, maintenance event notification, implied event, range detect failure, communications failure, timeout failure, and so forth. At 414, an action selected element can be provided that indicates one or more action types that may have been selected in accordance with the detected event (e.g., faulted I/O module has been automatically ordered). At 420, an event data element is provided. This can include various data types such as timer, counter, integer, floating point, binary, program information (e.g., faulted rung condition), and include help or document data to facilitate remote troubleshooting of the event. At 424, diagnostic data can be provided that relates to information concerning why an event or events were fired (e.g., status information relating to how event was detected). At 430, machine address and/or name information can be provided to indicate a physical location where an event occurred. At 434, parties who have also been contacted can be provided (e.g., user 1 and user 2 have also been contacted). This type information can help to coordinate responses and mitigate redundant maintenance activities. At 440, further suggested actions can be provided. For example, alternative troubleshooting information can be provided, more direct commands can be given such as system requires immediate operator interaction on site, or verify maintenance data from remote location to re-enable continued operations. At 444, optional actions can be provided such as replace specified minor system component at next scheduled system shutdown.

Figure 6:
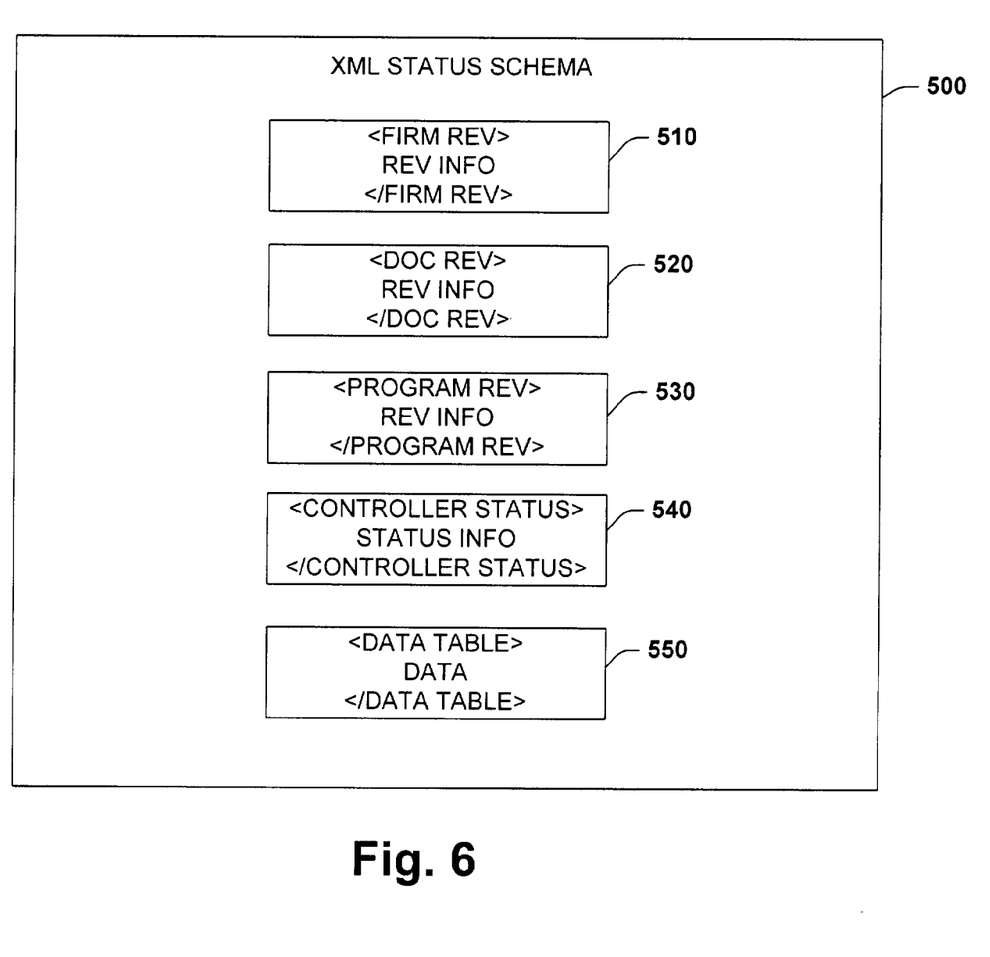
FIG. 6 is a diagram illustrating a status schema in accordance with an aspect of the present invention.

FIG. 6 is a diagram illustrating a status schema 500 in accordance with an aspect of the present invention. The status schema 500 can be generated and sent to remote systems in response to a remote network request as described above. The status schema 500 can include firmware revision information for a controller or associated module at 510, embedded document revision information at 520, and controller ladder program revision information at 530. Revision information can be employed by remote systems and users to determine whether a firmware, document, and/or program update should occur at the controller or associated device. For example, if the latest firmware revision is (1.4) and the controller indicates the present firmware revision is (1.3), a firmware update can be initiated via the update schema described below.

At 540, controller status information can be provided. This can include diagnostic information relating to the controller and/or to components such as I/O or communications modules interfacing to the controller. Such information can include messages like "All components are operating within specifications" or "Network Counters exhibiting slightly larger retry values," or "Analog values within specified ranges but, exhibiting one or more trends," for example. This information can also include encoded information such as diagnostic bits or words that describe one or more portions of the control system (e.g., rack communications retry counter=0000 hex). At 550, substantially any data that is accessible by the controller can be provided. This can include program variables, network information, module information, rack information, and/or other information.

Figure 7:
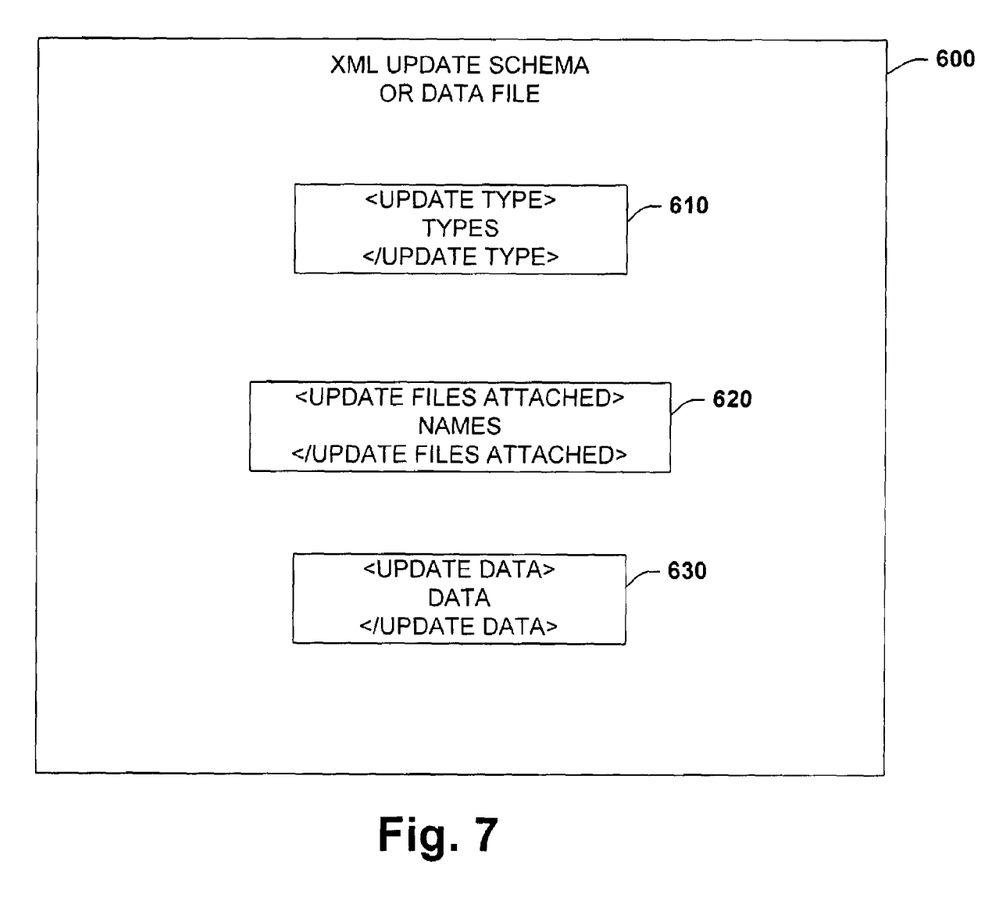
FIG. 7 is a diagram illustrating an update schema in accordance with an aspect of the present invention.

Referring to FIG. 7, a diagram 600 illustrates an update schema in accordance with an aspect of the present invention. At 610, an update type element specifies a proposed update for a controller or associated module. For example, this can include a firmware update, embedded document update, controller program update, and so forth. At 620, an element specifies whether the proposed update specified at 610 is included in the XML schema 600 or is included as an attachment to the schema. For example, firmware revisions are generally transmitted in binary. Thus, the element 620 can indicate that one or more attached binaries follow the XML update schema 600. In another example, embedded document type updates are generally specified in ASCII. Thus, an update data element 630 is provided that includes the updated document information within the schema 600. It is noted that the schema 600 can support having actual updated information stored therein and support having one or more attachments (e.g., non-XML data transmitted subsequently to the update schema), if necessary.

FIGS. 8–11 illustrate remote maintenance methodologies in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 8:
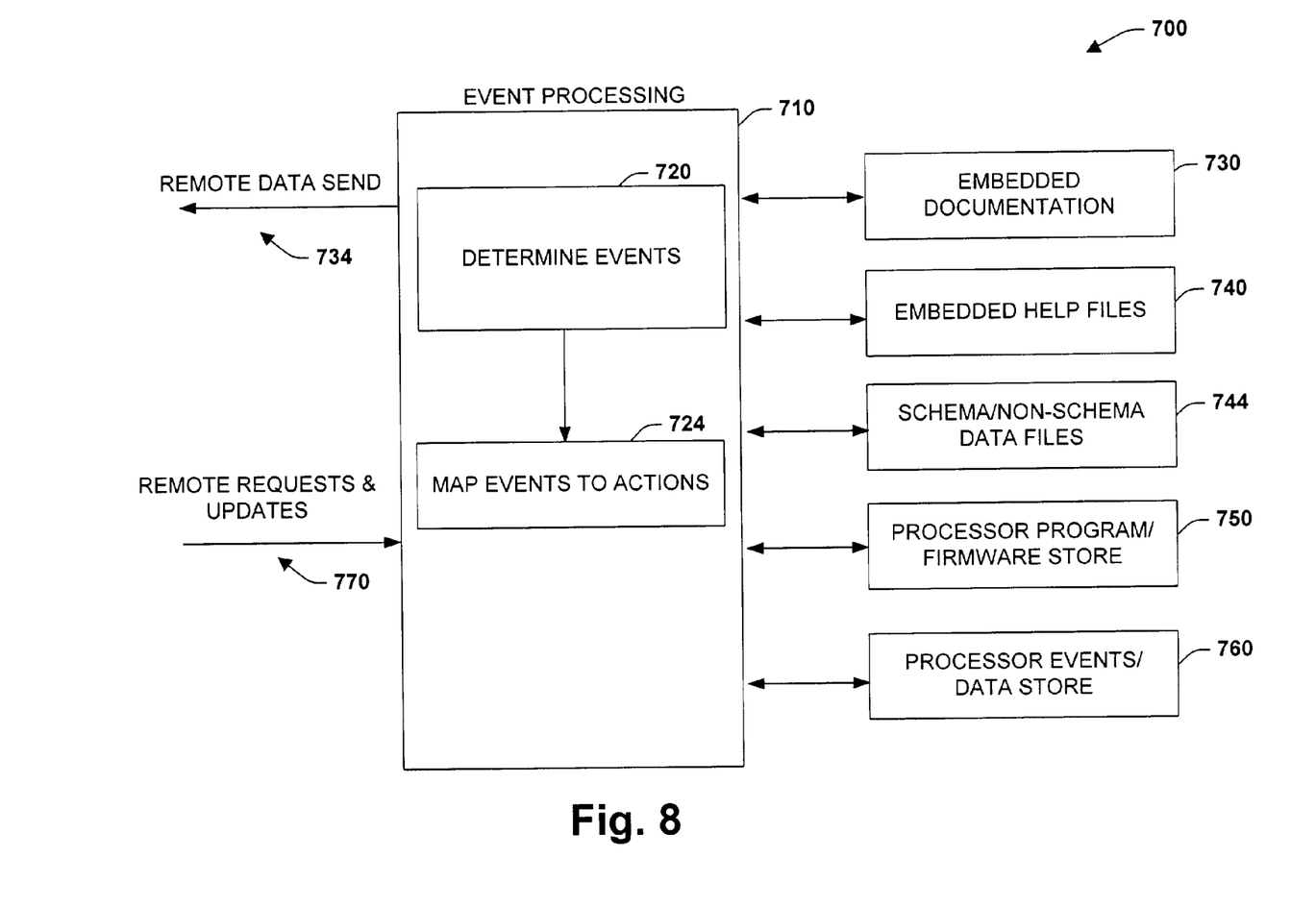
FIG. 8 is a block diagram illustrating event processing in accordance with an aspect of the present invention.

FIG. 8 is a diagram 700 illustrating event processing in accordance with an aspect of the present invention. At 710, a processing component determines one or more events at 720 and maps the events to one or more maintenance actions at 724. In accordance with the actions at 724, embedded documentation at 730 can be served to remote systems at 734 to further define and provide information relating to the event. This can also include serving embedded help files at 740 and schema/non-schema data at 744 that further describe the events determined at 720. In addition, a processor program and/or firmware data store can be accessed at 750 to determine current revision information and to receive updated programs or firmware data. At 760, an events data store can be processed that include processor determined flags and/or external input conditions that are detected (e.g., processor status inputs, hardware errors, implied condition flags). At 770, remote network requests are processed from one or more remote systems. This can include update requests and status requests which can also be processed as an event at 720 and mapped to an associated action or action at 724.

Figure 9:
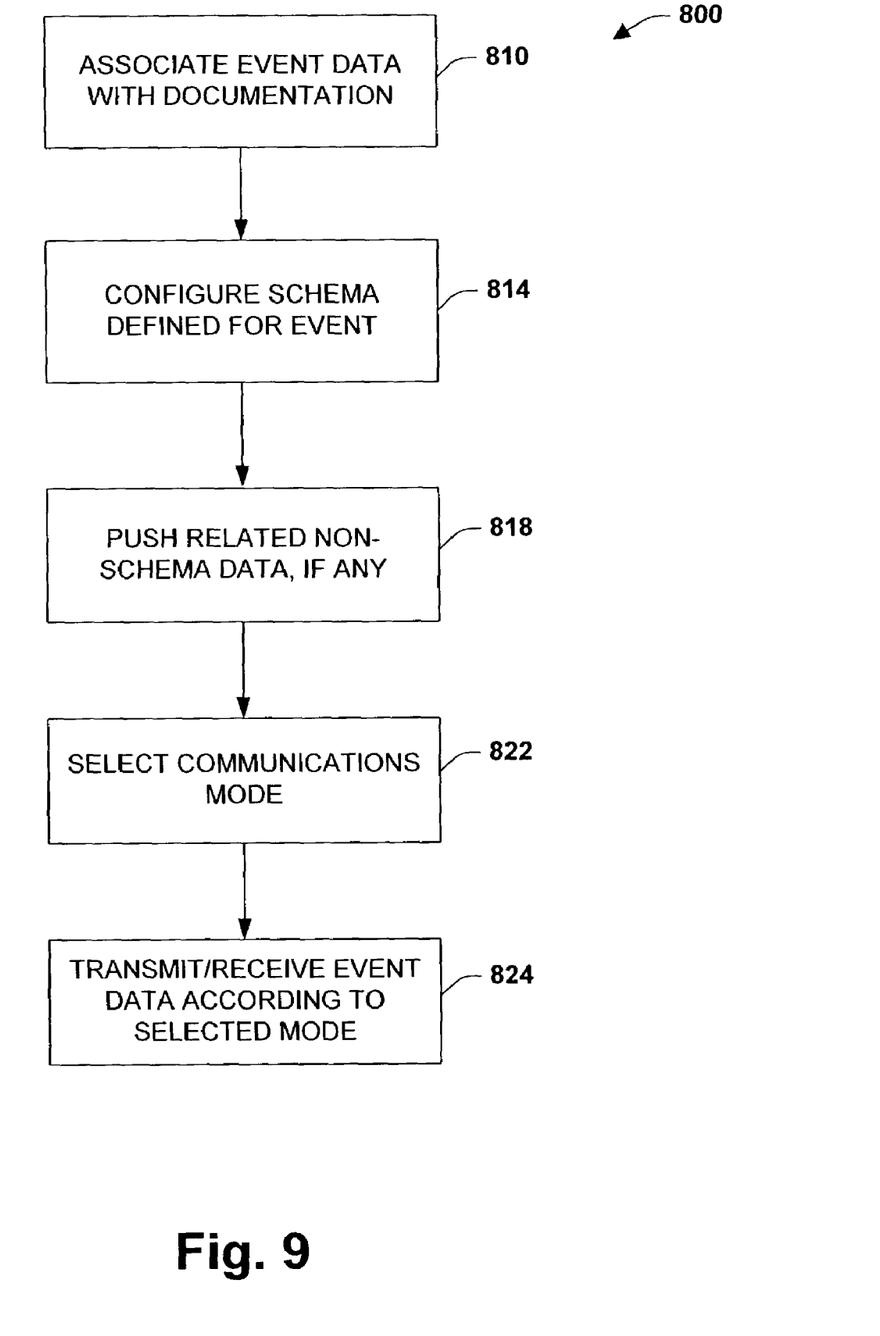
FIG. 9 is a flow diagram illustrating event processing in accordance with the present invention.

FIG. 9 is a flow diagram 800 illustrating an aspect of event and schema processing in accordance with the present invention. At 810, event data is associated with embedded documentation such as a help file, system diagram, maintenance manual, and so forth. This can include processing a list that maps possible events to the embedded documentation. At 814, a schema is configured for the event which can include the event documentation described at 810. As noted above, this can include generation of an event schema relating to the event or a status schema relating to information regarding one or more components of a control system. At 818, non-schema information is pushed if necessary. This can include sending information such as a binary file that is more efficiently transmitted as a separate file from the associated schema. At 822, a communications mode is selected for a respective event. As noted above, this can include polling, request/reply, and/or broadcast modes, wherein broadcasting can be at regular intervals or more in accordance with a one-shot broadcast transmission. At 824, schema and/or non-schema data is transmitted and received in accordance with one or more of the selected modes from 822.

Figure 10:
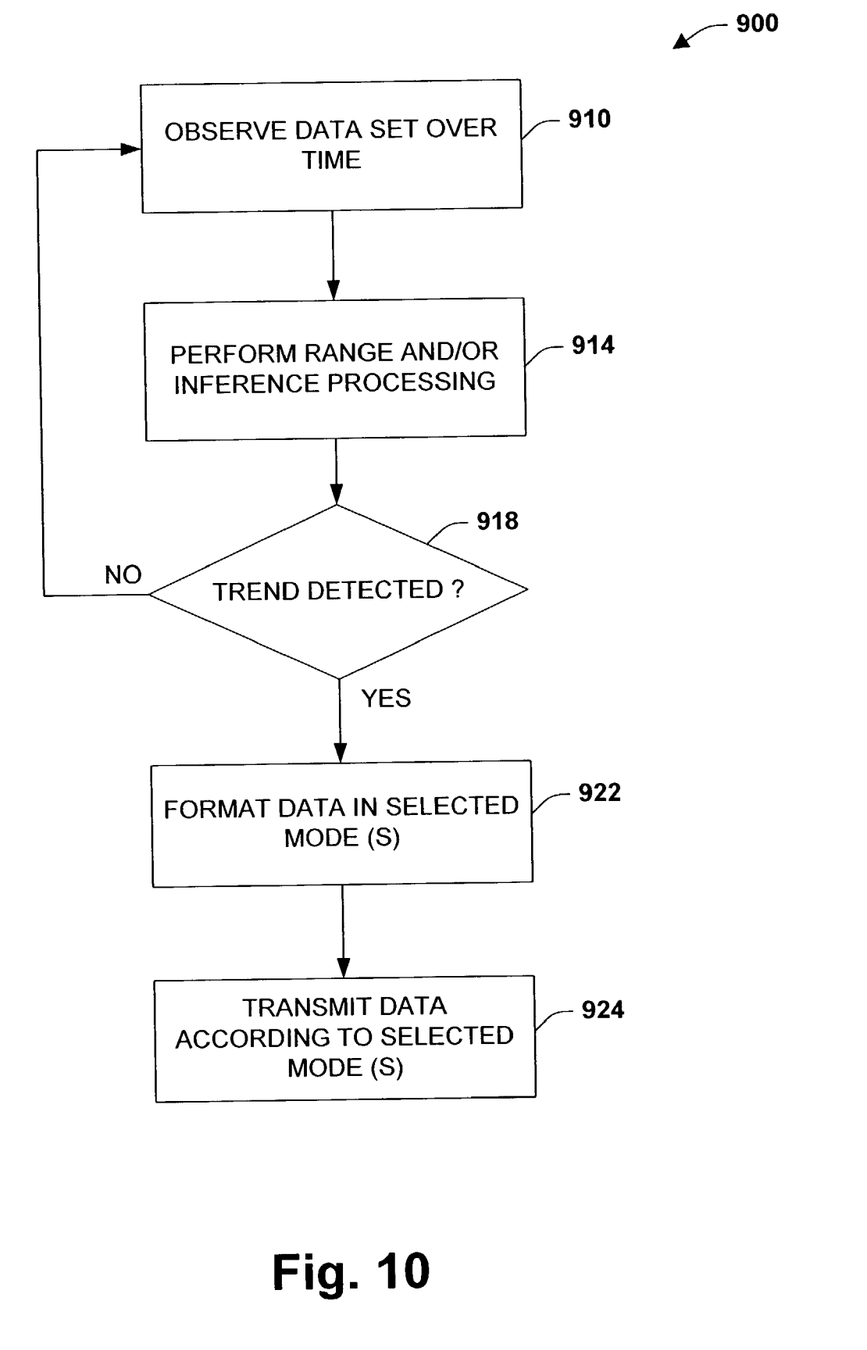
FIG. 10 is a flow diagram illustrating trend processing in accordance with the present invention.

FIG. 10 is a flow diagram 900 that illustrates trend processing in accordance with the present invention. At 910, one or more inputs and/or a data set are observed over time (e.g., data set analyzed during real-time interrupt service routine). At 914, statistical, probabilistic, range, and/or inference processing is applied to the data set of 910. At 918, a determination is made as to whether any trends are observed in the data of 910. If not, the process proceeds back to 910 for subsequent trend processing. If a trend is detected at 918, the process proceeds to 922, wherein data is formatted according to one or more modes. This can include retrieving and storing a series of data samples leading up to the detected trend, and/or can include formatting/retrieving additional data such as an embedded MPEG or sequence of image files that illustrate one or more aspects of the detected trend (e.g., retrieving embedded MPEG troubleshooting sequence for detected trend). This can also include formatting an associated schema file further describing the detected trend of 918. At 924, data is transmitted to one or more remote systems according to the selected modes at 922.

Figure 11:
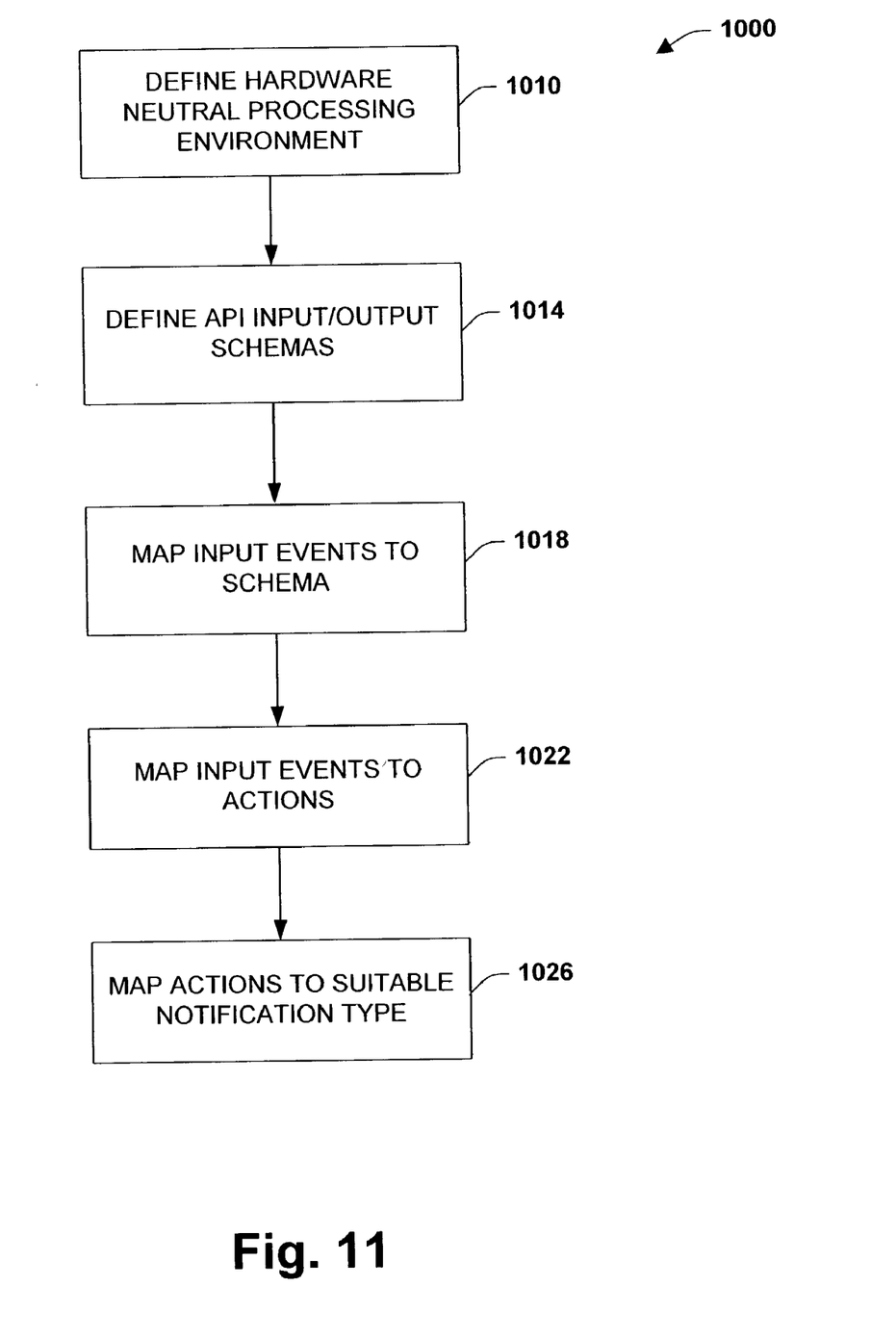
FIG. 11 is a flow diagram illustrating third party installations in accordance with the present invention.

FIG. 11 is a flow diagram 1000 illustrating third party installations of one or more remote maintenance components in accordance with the present invention. It is noted that the systems, processes and components previously described in FIGS. 1 through 10 supporting automated maintenance procedures can be provided as generic components supporting third party installation or downloading in control systems having various and/or unrelated architectures. At 1010, a hardware-neutral processing environment is defined. This can include processing of JAVA applets, C# components and/or include a runtime architecture that employs Just-In-Time (JIT) compiled code, for example, to execute one or more of the maintenance components previously described (e.g., .Net framework). At 1014, input and output schemas are defined and provided for interacting with the processing architecture of 1010. This can include event schemas, status schemas, update schemas, and/or other type schemas that send data to or from a control system. At 1018, input events are mapped to a schema defined at 1014. As an example, data sets or input bits can be defined as mapping to an event (e.g., over-range condition maps to a event schema describing information causing the over-range). If an input condition of 1018 becomes true, an associated action can be defined for the event at 1022 (e.g., notify user regarding detected maintenance condition). At 1026, the actions defined at 1022 can be mapped to a suitable notification type. For example, this can include an e-mail, page and/or voice mail transmissions, alarm/data transmissions to a web page, embedded documentation transmissions, video or audio transmissions, and/or substantially any data transmission determined to be related to the detected event.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:
   an industrial controller that communicates with a network;
   an event component associated with the industrial controller to detect at least one maintenance event;
   at least one schema to interface with the industrial controller in accordance with the maintenance event; and
   an action component that maps the maintenance event to an action to facilitate remote maintenance of the industrial control system over the network, the action provides temporal data that describes a sequence of occurrences leading up to the maintenance event.

2. The system of claim 1, further comprising a communications component to interact with the network.

3. The system of claim 2, the communications component including at least one of a web-server, an e-mail server, a dial-in server, a pager component, voice mail server, and a wireless access server.

4. The system of claim 3, the communications component including at least one of a stack and a data channel to process remote network requests and to transmit remote data.

5. The system of claim 4, the data channel including at least one of an HTTP socket, an FTP socket, a Telnet socket, and a Secure Socket Layer (SSL).

6. The system of claim 2, the communications component further comprising a request mode component that supports at least one of a polling mode, a broadcast mode, and a request/reply mode in support of remote maintenance of the industrial controller.

7. The system of claim 6, the broadcast mode further comprising at least one of a one-shot mode and a continuous mode.

8. The system of claim 1, the event component detects at least one of a direct and an implied maintenance event.

9. The system of claim 8, the direct maintenance event includes at least one of an external condition, an internal data condition, an external command, a range data condition, a fault condition, and a maintenance condition.

10. The system of claim 8, the implied maintenance event is determined from at least one of a statistical analysis, a probabilistic analysis, and an inference analysis.

11. The system of claim 10, the statistical analysis includes at least one of an averaging, standard deviation, comparison, sampling, frequency, and periodicity determination.

12. The system of claim 10, the probabilistic analysis includes a general probabilistic estimate to determine a maintenance condition given monitored evidence of an input pattern, the estimate stated as:
   $Pr(Cm|E_1, E_2, \ldots E_j)$;
   wherein Pr is a probability, Cm relates to a maintenance condition given evidence E relating to differences from monitored patterns, and J being an integer.

13. The system of claim 12, further comprising probability thresholds that are configured to fire an event based upon the probability estimate being above a predetermined probability threshold.

14. The system of claim 10, further comprising probability models that are constructed from typical controller operations.

15. The system of claim 14, further comprising at least one of monitoring data for typical variances and monitoring how often particular events occur.

16. The system of claim 10, further comprising inference models that are constructed from at least one of multiple and unrelated events to determine a maintenance condition.

17. The system of claim 10, further comprising classification models that are constructed to learn routine patterns in order to generate probabilities that predict potential system problems.

18. The system of claim 17, the classification models include at least one of Support Vector Machines (SVM), Naive Bayes, Bayes Net, decision tree, similarity-based, and vector-based models.

19. The system of claim 1, the action component adapted to at least one of configure a schema describing an event, transmit the schema to a remote location, transmit at least one of embedded visual, audio and temporal data, automatically order new components, alert appropriate entities, serve embedded documentation, and process upgrade requests.

20. The system of claim 19, the temporal data includes at least one of an MPEG and a JPEG file.

21. The system of claim 19, the new components are ordered via at least one of pre-configured order forms and generic order forms.

22. The system of claim 19, the embedded documentation includes at least one of help files to facilitate remote troubleshooting of the industrial control system, a hyper-text link documentation, a referenced documentation.

23. The system of claim 19, the upgrade requests include at least one of a firmware upgrade, a documentation upgrade and a program upgrade.

24. The system of claim 1, the at least one schema includes XML data describing at least one of an event schema, a status schema, and an upgrade schema.

25. The system of claim 24, the event schema further comprising elements that describe at least one of an event type, an action type, event data, diagnostic data, machine address, machine name, parties contacted, parties responding, actions required, and optional actions.

26. The system of claim 24, the status schema further comprising elements that describe at least one of a firmware revision, a document revision, a program revision, a controller status, and at least one data table value.

27. The system of claim 24, the upgrade schema further comprising elements that describe at least one of an update type, an attached file name, and update data.

28. A method to facilitate remote maintenance in an industrial controller, comprising:
   defining a plurality of maintenance events in an industrial control system;
   mapping the maintenance events to automated maintenance actions;
   configuring an XML schema in accordance with the maintenance actions, the schema describes a series of incidents immediately prior to the maintenance events; and
   transmitting the XML schema to remote locations to facilitate maintenance of the industrial control system.

29. The method of claim 28, further comprising associating the maintenance events with embedded documentation.

30. The method of claim 28, further comprising transmitting non-schema data to facilitate remote troubleshooting.

31. The method of claim 28, further comprising automatically selecting a communications mode to transmit the schema.

32. The method of claim 31, the communications mode including at least one of polling, requesting, replying, broadcasting, sending one-time transmissions, and sending transmissions at predetermined intervals.

33. The method of claim 28, further comprising observing a set of data over time to determine the maintenance event.

34. The method of claim 33, further comprising performing at least one of statistical, probabilistic, and inference processing to determine the maintenance event.

35. The method of claim 33, further comprising detecting a trend in the set of data.

36. The method of claim 28, further comprising:
defining at least one hardware-neutral maintenance component; and
utilizing the schema to interface with the maintenance components.

37. The method of claim 36, further comprising remotely installing the maintenance component as a third party maintenance system.

38. The method of claim 36, the hardware-neutral maintenance component is at least one of a JAVA applet and a C# component.

39. A system to facilitate remote maintenance in an industrial controller, comprising:
means for configuring at least one maintenance event in an industrial control system;
means for mapping the maintenance event to at least one automated maintenance action;
means for configuring a schema in accordance with the maintenance actions, the schema describes a sequence of occurrences that caused the maintenance event; and
means for transmitting the schema to remote locations to facilitate maintenance of the industrial control system.

40. An industrial control system, comprising:

an industrial controller that communicates with a network, the industrial controller adapted with at least one of a web server, phone server, and a wireless access server interface;

an event component associated with the industrial controller to detect at least one maintenance event, the maintenance event including at least one of a direct and an implied event;

at least one schema to interface with the industrial controller and at least one remote system in accordance with the maintenance event, the schema describes a sequence of occurrences prior to the maintenance event; and an action component that maps the maintenance event to a maintenance action to facilitate remote maintenance between the industrial controller and the at least one remote system.

* * * * *